W. H. KNIERIM.
FUEL FEEDING AND INDICATING MEANS.
APPLICATION FILED JUNE 29, 1917.
1,293,474.
Patented Feb. 4, 1919.
2 SHEETS—SHEET 1.
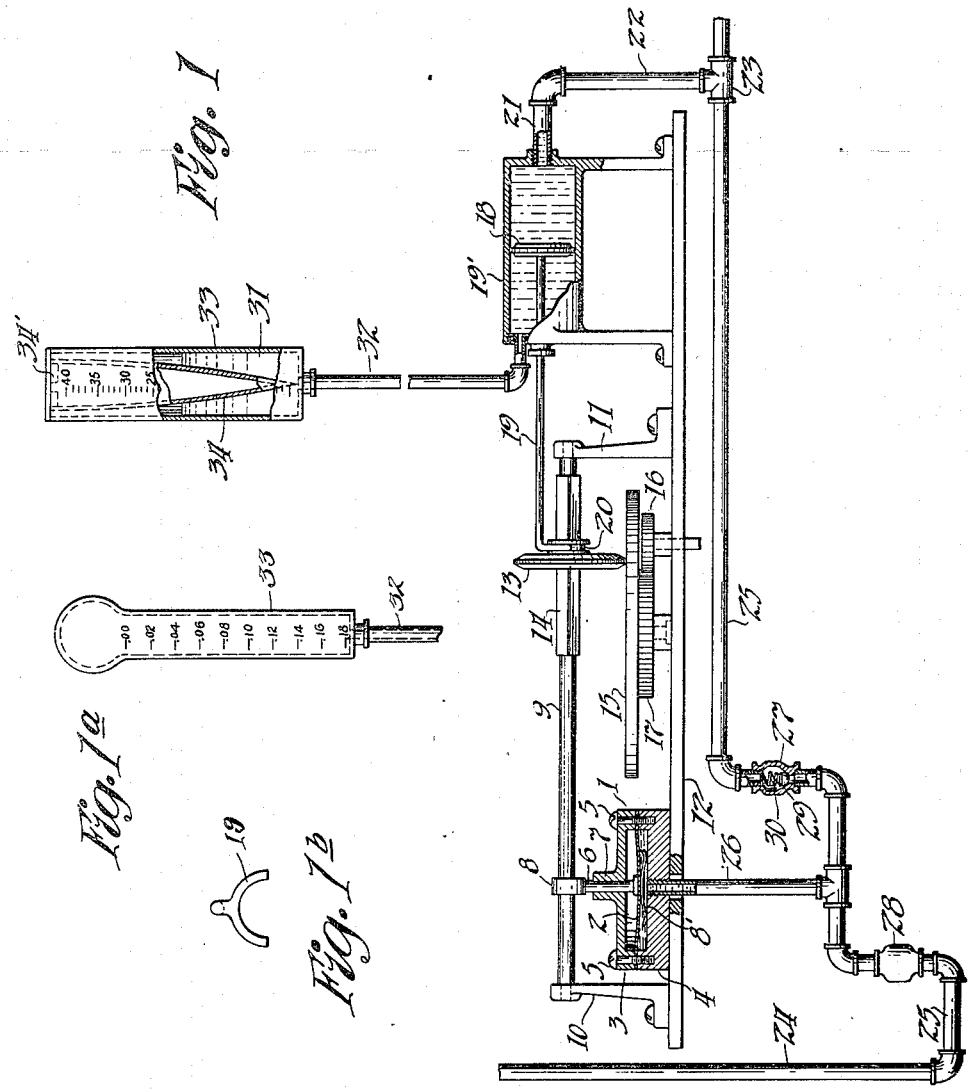
Witnesses:
H. L. Fisher
William A. Hardy
Inventor:
William H. Knierim
by Frederick Bachmann
his Atty.

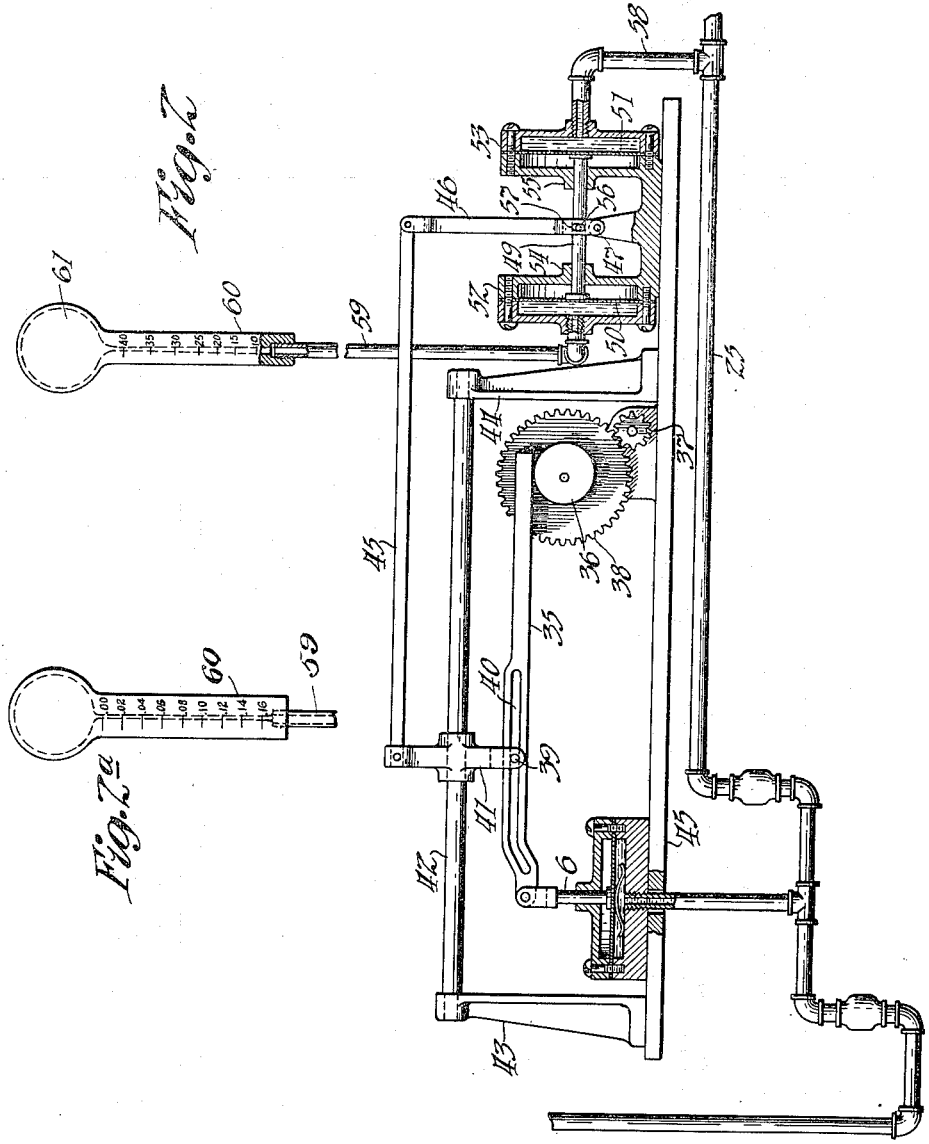

UNITED STATES PATENT OFFICE.

WILLIAM H. KNIERIM, OF NEW YORK, N. Y.

FUEL FEEDING AND INDICATING MEANS.

1,293,474.    Specification of Letters Patent.    Patented Feb. 4, 1919.

Application filed June 29, 1917. Serial No. 177,729.

*To all whom it may concern:*

Be it known that I, WILLIAM H. KNIERIM, a citizen of the United States, and a resident of New York, New York, have invented certain new and useful Improvements in Fuel Feeding and Indicating Means, of which the following is a description.

In connection with motor propelled vehicles using liquid fuel, it is very desirable to know at all times the rate at which fuel is being consumed in relation to the distance traveled by the vehicle. With internal combustion engines such as are now commonly used on automobiles the rate at which fuel is used is dependent on a number of factors any one of which may have a great effect on the efficiency of the engine, these factors including the particular adjustment and setting of the carbureter or ignition mechanism, the lubrication of the engine, the condition of the bearings, gears and tires, the presence of carbon deposit in the cylinders and other conditions of the motor and vehicle. The rate of fuel consumption is accordingly an indication of the efficiency of the engine or power plant and the transmission.

The principal object of my invention is to provide means for indicating the quantity of fuel used in relation to the amount of movement or travel of the engine shaft or the wheels or other part of the vehicle. This rate of fuel consumption may be expressed either as a given amount of fuel per unit distance or as a given distance per unit of fuel. More particularly in connection with motor propelled vehicles, my object is to provide an indicator which will show instantaneously and at any time the relation between the distance traversed by the vehicle and the amount of fuel, such as gasolene or other liquid fuel, consumed by the engine or power plant. This relation may be expressed as "miles per gallon" or "gallons per mile" or in various other ways. With a device of the character mentioned the driver is greatly aided in maintaining his equipment at the highest efficiency in that the device affords indication at all times of deterioration or improper condition or action of certain parts which affect the efficiency of motor, the transmission or other parts of the vehicle. Another object of my invention is to provide means for automatically controlling the rate of feed of gasolene or other fuel to the engine. Further objects will appear more fully in the following specification and appended claims.

In general my improved device consists of means for indicating the relation between the speed of rotation of the engine or vehicle wheel or other moving part and the rate of flow of the fuel. In particular, the preferred form of my invention consists of a pump or other means for feeding fuel to the motor, means for operating the pump or other feeding means from the wheel or other moving part of the vehicle, means whereby the operation of the pump is varied to automatically control the rate of feed of fuel, and an indicator for showing the relation between the speed of movement of the vehicle or of certain moving parts thereof and the rate at which the fuel is fed by the pump or fuel feeding means.

In order that my invention may be more clearly understood attention is hereby called to the accompanying drawings forming a part of this specification and in which—

Figure 1 is a view partly in elevation and partly in section showing one embodiment of my invention.

Fig. 1ᵃ is a view partly in elevation and partly in section of a modification of the indicator of the device shown in Fig. 1.

Fig. 1ᵇ is a view at right angles to that shown in Fig. 1 of the rod 19.

Fig. 2 is a view similar to that shown in Fig. 1 of the preferred embodiment of my invention.

Fig. 2ᵃ is like view of a modification of the indicator of the device shown in Fig. 2.

In all the views like parts are designated by the same reference numbers.

Referring to Fig. 1, the pump 1 comprises a hollow member provided with a flexible diaphragm 2 clamped between the upper member 3 and lower member 4 of the pump, these members being secured together as by screws 5. Bearing on the upper side of the diaphragm 2 at the center thereof is a rod 6 adapted to reciprocate in a bearing 7 in the upper member 3 of the pump. This rod is arranged to be forced downwardly by a cam 8, the resiliency of the diaphragm or the action of a spring 8' upon the diaphragm tending to cause the latter to move upwardly with the rod 6 so that upon rotation of the cam 8, the rod 6 and the diaphragm 2 are given a to and fro movement by the rotation of the cam. The cam 8 is mounted on a shaft 9 which is mounted for rotation in brackets 10 and 11 upon the base plate 12 of the device. The shaft 9 is driven by a wheel 13 mounted upon a portion 14 of the shaft 9 having a rectangular cross section, the wheel 13 being arranged to slide axially on the portion 14 of the shaft 9, yet causing the said shaft to rotate with it because of the co-action of the rectangular portion 14 of the shaft and a correspondingly shaped aperture in the wheel through which the portion 14 of the shaft passes. The wheel 13 engages a flat disk 15 rotated in any suitable way, as by gearing 16 and 17 and any other suitable means (not shown), from the wheel of the vehicle or the motor shaft. The position of the wheel 13 upon the disk 15 is governed by the motion of a piston 18 connected, as by rod 19, to the wheel 13, the piston 18 operating and fitting closely in the cylinder 19′. The portion of the rod 19 engaging the disk 13 is forked as shown in Fig. 1ᵇ, this forked portion engaging within a groove 20 on the hub of wheel 13, this construction permitting rotation of the wheel without necessitating the rotation of piston 18 and rod 19. One end of the cylinder 19′ communicates, as through pipes 21 and 22, with the fuel feeding piping, as shown at 23, at a point between the pump and the engine. The fuel feeding conduit as shown comprises a pipe 24 leading from the source of fuel supply and piping 25 connected to pipe 24 and consisting of a number of connected pipe sections arranged to conduct the fuel from the pipe 24 past the connection 23 to the engine. The piping 25 is connected at a point intermediate pipe 24 and the connection 23 with the pump 1, as by means of a pipe 26. Check valves 27 and 28 are arranged in the piping 25 to permit the flow of the fuel from the pipe 24 to the engine while preventing its return to the intake pipe 24. The valves may be of any suitable construction, the valves shown comprising a ball 29 resiliently held in engagement with its seat, as by spring 30. The side of the cylinder 19′ opposite that connected with the pipe 21 is filled with any suitable liquid, this liquid also partly filling indicator 31, the interior of which is connected, as by piping 32, with that part of the cylinder 19′ containing said liquid. The indicator, as shown, comprises a tube 33 of glass or other transparent material and a member 34 having a conoidal shape arranged within the tube 33 with its apex toward the bottom of the said tube. The member 34 and the tube 33 are connected to each other by openings 34′ in the upper part of the member 34. The tube 33 is air tight, and the upper part of this tube and the member 34 contain a gas, such as air, under a slight pressure, this gas tending to force the liquid out of the tube and thereby to move the piston toward the right, referring to Fig. 1, and to place the wheel 13 in the position nearest to the periphery of the disk 15 and where the greatest amount of liquid will be pumped per revolution of the disk. The interior member 34 acts as a reservoir for the gas under pressure.

In operation the movement of the disk 15 by the operation of the engine shaft or vehicle wheel drives the wheel 13 and through it shaft 9, cam 8, rod 6 and diaphragm 2, so as to cause the pump 1 to pump the fuel to the engine. If the amount of fuel pumped to the engine is too great the pressure rises in the feeding system, in the member 22 and in the end of the cylinder 19 to which the said member is connected, this increase of pressure causing the piston 18 to move so as to carry the wheel 13 toward the center of the disk 15 to thereby lessen the rate of pumping. If the amount of fuel pumped is not sufficient, the pressure on the fuel side of the piston 18 decreases and the wheel 13 is moved toward the position where the rate of pumping is increased because of the gas pressure in the indicator. Hence the tendency of the piston and of the wheel is always to take a position where the amount of fuel pumped equals the amount required by the engine. It will be seen that so long as there is a fixed ratio between the speed of rotation of part 15 and the speed of operation of the pump 1 the wheel 13 will remain a fixed distance from the center of the disk 15. In other words, so long as the distance traveled by the vehicle in a given time bears a fixed ratio to the amount of fuel consumed in the same time or vice versa, the wheel 13 will remain a constant distance from the center of the disk 15 and the level of the liquid in the indicator 33 will remain constant. If, however, a greater amount of fuel is necessary for a given distance traveled by the vehicle, the wheel 13 will move away from the center of the disk and the level of the liquid in the indicator 33 will fall. If a decreasing amount of fuel is taken for the operation of the engine over a given distance the wheel 13 will be moved toward the center of disk 15 and the level of the liquid in the indicator will rise. By properly graduating the indicator it is possible to show at a glance by the level of the liquid therein the rate of fuel consumption with respect to the distance traveled by the vehicle, as, for example, the number of gallons of gasolene used per mile traversed by the vehicle or the number of miles traversed by the vehicle per gallon of fuel gasolene.

The operation of the device and the reason for employing the conoidal member 34 in the indicator will be apparent from a consideration of the following mathematics:

Let $x$ = distance of wheel 13 from center of disk 15.

$R_1$ = revolutions per minute of disk 15.

$R_2$ = revolutions per minute of wheel 13.

$c_1 R_1$ = miles per minute of vehicle and $c_2 R_2$ = gallons per minute of fuel pumped where $c_1$ and $c_2$ are known constants.

Miles traversed by vehicle per gallon of fuel consumed = miles per minute of vehicle divided by gallons per minute of fuel pumped =

$$\frac{c_1 R_1}{c_2 R_2}$$

Now if D = radius of wheel 13

$$R_1 2\pi x = R_2 2\pi D$$

since distance traveled in a minute by a point in circumference of the wheel 13 and a point on the circle of the disk having a radius $x$ are equal.

From the last named equation we obtain equation $$\frac{R_1}{R_2} = \frac{D}{x}$$

from which miles per gallon =

$$\frac{c_1 R_1}{c_2 R_2} = \left(\frac{c_1}{c_2} D\right) \text{ times } \frac{1}{x}$$

Also gallons per mile =

$$\frac{c_2}{c_1 D} \text{ times } x.$$

From the above equations it will appear that there is in the equation showing miles per gallon an inverse ratio between the distance $x$ and the miles per gallon, and if it is desired to obtain a uniform scale on the indicator 33 with the graduations uniformly spaced, the horizontal cross section of the liquid chamber will not be of uniform area for different heights. From the equation given above I have found that the graduations on the cylindrical tube 33 may be made uniform if a member of inverted conoidal shape, as shown at 34, is positioned in the said tube, an annular chamber being formed between the member 34 and the tube 33. With this chamber the graduations for miles per gallon or its equivalent may be made uniform as shown.

Referring to the above equation for gallons per mile, it will be seen that the gallons per mile vary directly with $x$ so that for indicating the same a single tube 33 of uniform diameter will permit the employment of uniform graduation as shown in Fig. 1ª without the employment of an insert such as is shown at 34, Fig. 1.

The apparatus shown in Fig. 2 employs a pump and a fuel feed system like that shown in Fig. 1, but the means for controlling the amount of fuel pumped and the indicating means are of modified construction. For operating the pump rod 6 a lever 35 is employed, this lever being actuated by cam 36 driven from the wheel of the vehicle or from the shaft of the motor or any of the parts movable therewith by means of gearing 37, 38 and any other suitable means (not shown). The amount of fuel pumped in this form of my invention is determined not only by the speed of rotation of the cam 36 but also by varying the position of the fulcrum 39 of the lever 35. This fulcrum, as shown, is in the form of a pin passing through a longitudinal slot 40 in the lever 35, the pin being carried by a member 41 which is movable longitudinally upon a rod 42 extending longitudinally of the lever 35 and supported in brackets 43 and 44 carried by the base plate 45. The member 41 is moved longitudinally on the shaft 42 by means of a link 45 pivotally connected to the said member at one end and pivotally connected at its opposite end to an amplifying lever 46, which is pivoted, as shown at 47, to an upwardly extending bracket and mounted on the base plate 45. The lever 46 is oscillated by means of a rod 49 lying between and bearing upon two flexible resilient diaphragms 50 and 51, the former being secured within a casing 52 and the latter within a casing 53. The rod 49 is supported in bearings 54 and 55 in the casings 52 and 53 respectively and is provided with a pin 56 mounted in a slot 57 extending longitudinally of the lever 46 whereby longitudinal oscillation of the rod 49 causes the oscillation of the lever 46 about its pivot 47. The piping 58 or any other suitable conduit permits the flow of fuel from the piping 25 to a chamber in the casing 53 on the right-hand side of the diaphragm 51. A chamber in the casing 52 on the left-hand side of the diaphragm 50 communicates through piping or any other suitable conduit 59 with the indicator 60. The indicator 60 is shown with a bore of varying horizontal cross section to permit uniform indication of the number of miles traversed by the vehicle per gallon of fuel consumed or its equivalent, while at the same time permitting the use of uniform graduation. The indicator 60 and the chamber of the casing 52 with which it communicates contain a suitable indicating liquid, the indicator 60 being transparent to permit observation of the upper level of the liquid. The indicator is provided at its upper end with an enlargement 61 containing gas tending to force the liquid down into the indicator and to move the diaphragm 50 to the right, the position corresponding with the maximum stroke of the rod 6.

If an excessive amount of fuel is fed to the engine, the pressure of the liquid in the conduit 58 and the right-hand chamber of the casing 53 increases, thereby forcing the diaphragm 51, the rod 49 and the diaphragm 50 to the left, causing the level of the liquid in the indicator to be raised, the movement of the rod 49 causing movement of the lever 46, link 45, member 41 and pivot 39 to the left, referring to Fig. 2, this shifting of the pivot 39 causing a shortening of the stroke of the member 6 and thereby lessening the amount of fuel pumped to the engine. By the employment of the amplifying lever 46, a much greater movement is obtained for the pivot 39 than that of the diaphragms 50 and 51. When insufficient fuel is being pumped to the engine the pressure in the conduit 58 and the chamber connected therewith drops and the gas in the part 61 forces the liquid in the indicator to move downwardly and to move the diaphragm 50, rod 49 and diaphragm 51 to the right, referring to Fig. 2, thereby causing the shifting of the fulcrum or pivot 39 to the right and increasing the stroke of the rod 6 and the amount of fuel pumped to the engine in a given time. The indicator 60 if properly graduated will show the miles or other unit of distance traveled by the vehicle for a gallon or other unit volume of fuel consumed.

Considering mathematically the operation of the device shown in Fig. 2,
Let
 $L$ = effective length of lever 35.
 $x$ = mean distance from pivot 39 to point of engagement between the lever 35 and the cam 36.
 $R_1$ = revolutions per minute of the cam.
 $d$ = total travel of cam end of rod per revolution of cam.
 $g$ = travel of pump end of lever 35 when cam end thereof moves a distance $d$.
 $c_1 g$ = gallons pumped per movement $g$.
 $c_2 R_1$ = miles per minute.
 $c_1 g R_1$ = gallons per minute.
Then
$$\frac{c_2 R_1}{c_1 R_1 g} =$$
rate of use of fuel expressed in miles per gallon.
As
$$\frac{d}{g} = \frac{x}{L-x}$$
$$\frac{1}{g} = \left(\frac{x}{L-x}\right) \text{ times } \frac{1}{d}$$
whereby rate of use of fuel expressed in miles per gallon =
$$\frac{c_2 R_1}{c_1 R_1 g} = \frac{c_2}{c_1 d} \text{ times } \frac{x}{L-x}$$
or rate of use of fuel expressed in gallons per mile =
$$\frac{c_1}{c_2} d \text{ times } \frac{L-x}{x}$$
where $c_1$ $c_2$ $d$ and $L$ are known constants.

From these equations the graduations for the indicator 60 may be readily computed. In Fig. 2 I have shown the indicator 60 graduated for miles of distance traversed by the vehicle per gallon of fuel consumed, and in Fig. 2ᵃ I have shown the same graduated for gallons of fuel consumed per mile traversed by the vehicle.

From the foregoing it will be seen that I have invented a device whereby a visual indication may be had instantaneously and at all times showing the fuel consumption of a motor propelled vehicle in relation to the distance traversed by the vehicle. The device, however, is not restricted to use with vehicles, but may be employed in any case where it is desired to determine the relation between the fuel consumption and the amount of motion of a particular body or the relation between the flow of a liquid and the movement of a body dependent in any way on the flow of said liquid. Whereas two forms of the invention are shown, the invention may be embodied in many other forms. Where in the claims reference is made of the rate of feeding of the fuel with respect to the travel of the movable member, this expression is to be understood to include miles per gallon, gallons per mile or any comparison of the amount of fuel consumed and the distance traversed.

What I claim as new and on which I desire Letters Patent of the United States, is as follows:

1. The combination of a movable member, fuel feeding means, means controlled by the pressure in said fuel feeding means for automatically controlling the rate at which fuel is fed by said feeding means, and means for instantaneously indicating the rate of feeding of the fuel with respect to the travel of said movable member.

2. The combination of a movable member, fuel feeding means, means controlled by the pressure in said fuel feeding means for automatically regulating the rate at which fuel is fed by said feeding means, and means controlled by said regulating means for instantaneously indicating the rate of feeding of the fuel by said feeding means with respect to the travel of said movable member.

3. The combination of a movable member, fuel feeding means, means controlled by said movable member and the pressure in said fuel feeding means for automatically regulating the rate at which fuel is fed by said feeding means, and means for instantaneously indicating the rate of feeding of the fuel by said feeding means with respect to the travel of said movable member.

4. The combination of a movable member, fuel feeding means, means controlled by the pressure in said fuel feeding means for automatically regulating the rate at which fuel is fed by said feeding means, and means for indicating the rate of feeding of the fuel by said feeding means with respect to the travel of said movable member, said automatic regulating means comprising a device movable with changes of pressure in said fuel feeding means.

5. The combination of a movable member, fuel feeding means, means controlled by the pressure in said fuel feeding means for automatically regulating the rate at which fuel is fed by said feeding means, and means for indicating the rate of feeding of the fuel with respect to the travel of said movable member, said fuel feeding means comprising a lever and said automatic regulating means comprising a device for varying the relative effective lengths of the arms of said lever.

6. The combination of a movable member, fuel feeding means, means controlled by the pressure in said fuel feeding means for automatically regulating the rate at which fuel is fed by said feeding means, and means for indicating the rate of feeding of the fuel with respect to the travel of said movable member, said fuel feeding means comprising a lever and said automatic regulating means comprising a device for shifting the fulcrum of said lever.

7. The combination of a movable member, fuel feeding means, means controlled by the pressure in said fuel feeding means for automatically regulating the rate at which fuel is fed by said feeding means, and means for indicating the rate of feeding of the fuel with respect to the travel of said movable member, said fuel feeding means comprising a lever operated by said movable member and said automatic regulating means comprising a device for varying the relative effective lengths of the arms of said lever.

8. The combination of a movable member, fuel feeding means, means for automatically regulating the rate at which fuel is fed by said feeding means, and means for indicating the rate of feeding of the fuel with respect to the travel of said movable member, said fuel feeding means comprising a lever operated by said movable member and said automatic regulating means comprising a device for varying the relative effective lengths of the arms of said lever.

9. The combination of a movable member, fuel feeding means, means controlled by the pressure in said fuel feeding means for automatically regulating the rate at which fuel is fed by said feeding means, and means for indicating the rate of feeding of the fuel with respect to the travel of said movable member, said indicating means comprising means tending to operate said automatic regulating means.

10. The combination of a movable member, fuel feeding means, means controlled by the pressure in said fuel feeding means for automatically regulating the rate at which fuel is fed by said feeding means, and means for indicating the rate of feeding of the fuel with respect to the travel of said movable member, said indicating means including a device containing a fluid under pressure tending to operate said automatic regulating means.

11. The combination of a movable member, liquid feeding means, means controlled by the pressure in said liquid feeding means for automatically controlling the rate at which liquid is fed by said feeding means, and means for instantaneously indicating the rate of feeding of the liquid with respect to the travel of said movable member.

12. The combination of a movable member, liquid feeding means, means controlled by the pressure in said liquid feeding means for automatically regulating the rate at which liquid is fed by said feeding means, and means controlled by said regulating means for instantaneously indicating the rate of feeding of the liquid by said feeding means with respect to the travel of said movable member.

13. The combination of a movable member, liquid feeding means, means controlled by the pressure in said liquid feeding means for automatically regulating the rate at which liquid is fed by said feeding means, and means for indicating the rate of feeding of the liquid with respect to the travel of said movable member, said liquid feeding means comprising a lever and said regulating means comprising a device for varying the relative effective lengths of the arms of said lever.

This specification signed and witnessed this 28 day of June, 1917.

WILLIAM H. KNIERIM.

Witnesses:
ARTHUR MUDD,
WESLEY A. BREMER.